Aug. 11, 1959     H. B. VINCENT     2,899,575
GLASS-TO-METAL SEALS IN CATHODE-RAY TUBES
Filed July 18, 1956

INVENTOR
H.B. VINCENT
BY W.A. Schaich &
L.D. Soubier
ATTORNEYS

United States Patent Office 2,899,575
Patented Aug. 11, 1959

2,899,575

GLASS-TO-METAL SEALS IN CATHODE-RAY TUBES

Harvard B. Vincent, Toledo, Ohio, assignor to Owens-Illinois Glass Company, a corporation of Ohio Application July 18, 1956, Serial No. 598,625

3 Claims. (Cl. 313—64)

The present invention relates to glass-to-metal seals and more specifically to the attachment of mounting members for internal components within electronic tubes such as cathode-ray picture tubes for color television transmission and reception. The subject seals are created by thermally adhering a plurality of vitreous materials of differing thermal properties to metal mounting members, which members are subsequently fused thereby to interior surfaces of glass envelopes for retaining color-producing components in picture tubes.

The development of color television picture tubes has been hindered by stringent requirements of precise alignment of internal components, especially color-producing elements mounted within the face plate portion of the tube. An apertured structure such as a shadow mask or line grid is usually disposed adjacent to the tube screen to control electron impingement upon phosphors of three primary colors. The apertured structure frequently consists of a heavy metal frame and bulky clamping mechanism both of which add to the difficulty of tube assembly and exhaust. Firm attachment of this structure to the interior of a glass face plate is imperative to insure its permanent and reproducible alignment with the phosphor screen for proper color registry. The glass and metal cannot be directly fused by heat during sequential assembly of the tube parts without at least some distortion of or damage to the parts, some of which cannot tolerate temperatures in excess of 540° C. Such fusion is also impractical to facilitate accurate restraint of the color-control structure which by necessity must be removable from and relocatable in exactly the same position within the area of the tube face plate.

It is known that when a relatively low-melting glass sealant of a common type such as lead silicate is employed to join a preoxidized metal alloy member to glass, after glazing the member therewith and subsequently attaching the same by fusion of the sealant, the bond to the glass thus created is satisfactory, but the metal bond is decidedly weak. It has been found by the inventor that the strength of attachment can be definitely improved by a multiple glazing of the alloy member, first with a relatively high-melting glass, and then applying a second glazing of relatively low-melting sealant thereover. Experimental data obtained using the multiple glazing principle have shown substantially improved attachment strength.

Accordingly, it is an object of this invention to provide an attachment member which may be thermally fused to glass at temperatures below which deleterious effects are created in either the glass or any of the electronic elements of the tube. Also successful sealing of a metallic member to glass having substantially dissimilar expansion coefficients may be accomplished by multiple glazing without any requirement that the metal member be very thin or thinly tapered in the seal area.

Another object of the present invention is to furnish metallic mounting members which are readily adaptable to firm bonding to the flange portion of a glass face plate by localized application of heat.

Another object of the present invention is to provide coated metallic members capable of forming effective glass-to-metal bonds by thermal fusion at relatively low temperatures regardless of differences in their thickness or expansion and contraction characteristics.

Another object of the present invention is to provide a glass and metal joint having required qualities of mechanical strength and permanence and into which minimum stresses are induced by reason of different physical properties during thermal fusion thereof.

A further object of the present invention is to furnish a glass face plate for an evacuated electron tube incorporating a plurality of metallic mounting members permanently welded to the glass at lower temperatures than has heretofore been possible without distorting or damaging parts adjacent to the weld.

Many other objects and advantages will, of course, become apparent and at once suggest themselves to those skilled in the art to which the invention is directed by reading the following specification and claims in connection with the accompanying drawing wherein:

Figure 1:
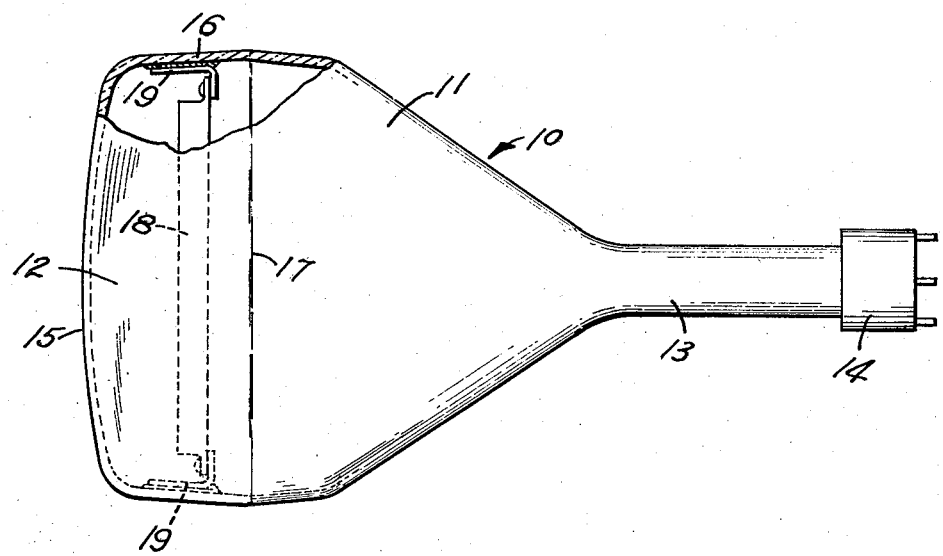
Fig. 1 is an elevational view partly in section of a cathode-ray tube embodying one form of the subject invention.

The illustrated embodiment of the present invention consists of a cathode-ray tube 10 having an all-glass envelope formed of prefabricated and joined glass parts, namely, funnel 11, face plate 12 and neck tubulation 13. Funnel 11 is frusto-conical in shape with its large and small ends hermetically sealed by face plate 12 along the line 17 and by tubulation 13 respectively. One or more beam guns 14 are sealed into the extremity of neck tubulation 13 to furnish an electron source which is directed toward the screen or image area 15 of face plate 12. Face plate 12 is fabricated with an annular flange 16 extending from and around the periphery of the concave surface of curved image area 15.

A color-control element 18 such as a shadow mask or line grid is supported within the interior of flange 16 by a plurality of at least two and preferably three or four support members 19 thermally fused to the inner surface of flange 16 at spaced intervals. Element 18 which in present practice consists of an apertured structure is arranged in precisional alignment with a target of known phosphorescent materials (not shown) located on the interior surface of image area 15. Thus electrons from beam guns 14 are directed to impinge upon suitable phosphors to reproduce desired colors.

Figure 2:
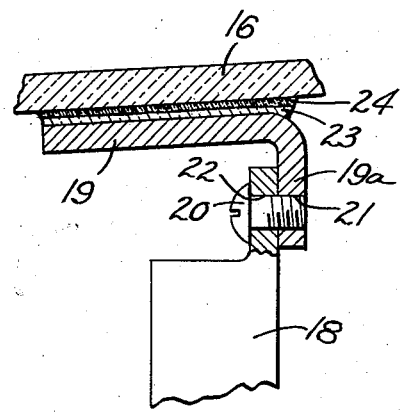
Fig. 2 is an enlarged vertical sectional view of the upper left portion of Fig. 1.

Supporting clip members 19 may be L-shaped in cross-section with their longer legs designed to generally parallel the inner surface of flange 16 as shown on Fig. 2. When each member 19 is properly installed by attachment to flange 16, its short leg 19a extends transverse to the tube axis for retention of element 18. Any one of various known forms of connection may be applied to clip member 19 to retain element 18 along suitably designed edges thereof. One form of such connection is to initially form a threaded opening 21 in short leg 19a into which a threaded machine bolt 20 may be inserted extending through an opening 22 in the edge of element 18. Thus, with at least two, three, or four members 19 generally equally spaced around flange 16, element 18 may be firmly held in alignment with the tube screen. Members 19 may consist of stabilized, preoxidized stainless steel alloys comprised essentially of iron and chromium oxides along with other minor ingredients such as nickel, silicon, manganese and aluminum oxides, which alloys are commonly utilized in evacuated electronic devices.

Each member 19 is coated over its sealing or attaching surface with a multiple glazing of several coatings 23 and 24 as shown on Fig. 2. Coating 23 consists of a relatively high-melting glass, such as one employed to form the tube parts for example, and is independently applied directly over the attaching surface, i.e., the longer leg of member 19. Coating 23 may have a coefficient of contraction in the range of from $90-100\times10^{-7}$ through the temperature range of from 250 to 0° C., which coefficient should be reasonably compatible with that of metallic member 19. Coating 23 because of its high-melting characteristics is initially fused to member 19 prior to its installation in face plate 12 at temperatures required to establish a firm bond therebetween. Such temperatures may be of the order of from about 650 to 1050° C. depending upon the particular combination of glass and metal to be joined. This application of high-melting coating 23 is made out of proximity to prefabricated glass or other tube parts to prevent damage thereto.

Examples of glass compositions which are useful for both the coating 23 as well as tube parts are given below:

1

|  | Percent |
|---|---|
| $SiO_2$ | 64.13 |
| BaO | 10.47 |
| Impurities analyzed as $R_2O_3$ | 4.13 |
| CaO-MgO | 2.36 |
| $Na_2O$ | 7.91 |
| $K_2O$ | 10.17 |
| $Sb_2O_3$ | 0.20 |
| $As_2O_3$ | 0.20 |
| MnO | 0.10 |
| $F_2$ | 0.55 |
|  | 100.22 |
| $F_2$ equiv. | −.22 |
|  | 100.00 |

2

|  | Percent |
|---|---|
| $SiO_2$ | 56.7 |
| $Al_2O_3$ | 1.4 |
| $Na_2O$ | 4.2 |
| $K_2O$ | 8.0 |
| PbO | 29.5 |
| MgO | 0.1 |
| CaO | 0.1 |
|  | 100.0 |

In addition to the illustrated compositions, other glasses such as soda-lime-silica glasses having similar thermal expansions approximately in the range of from $90-105\times10^{-7}$ may be similarly employed to advantage.

Coating 24 consists of a relatively low-melting glass solder or glass sealing composition which is coated over and adhered to the base coating 23 on member 19. Coating 24 has a softening temperature below approximately 540° C., preferably in the range about 450 to 500° C., and sealing characteristics which are compatible with both the base glass of flange 16 and coating 23. Coating 24 is selected as one having a fiber softening point temperature below the annealing point temperature of coating 23. Lead silicate is a sealant which may be employed as coating 24. Other glass sealing compositions have been fully disclosed in the copending application of Francl and Hagedorn, entitled "Low Temperature Glass Sealing Composition," Serial No. 554,753, filed December 22, 1955, now abandoned. Examples of two typical, low-melting sealing compositions suitable for coating 24 are set forth below:

3

|  | Percent |
|---|---|
| PbO | 71 |
| $B_2O_3$ | 17 |
| ZnO | 9 |
| CuO | 3 |
|  | 100 |

4

|  | Percent |
|---|---|
| PbO | 71.15 |
| $B_2O_3$ | 15.41 |
| ZnO | 9.48 |
| CuO | 1.88 |
| $SiO_2$ | 2.08 |
|  | 100.00 |

Coatings 23 and 24 are placed over desired areas of each individual member 19 in the prescribed order apart from the prefabricated tube components and prior to sealing face plate 12 to funnel 11 along the line 17. Decreasing high temperatures of the stated ranges are needed to stepwise adhere first coating 23 and then second coating 24 to form extremely strong bonds between the double glazing and the metallic alloy member 19. Coatings 23 and 24 may be applied in pulverized form of from 10 to 200 mesh with each dispersed in a suitable binder. Coating 23 is first applied in suitable form to the desired surface of member 19 and united therewith by heating to a temperature in the range of from 650 to 1050° C. Member 19 is allowed to cool and then a second coating 24 is placed over coating 23 and bonded thereto by subjecting the part to a lower temperature in the range of from 450 to 500° C. Coatings 23 and 24 are heated with the maximum temperatures in each application continued for rather brief periods of time varying from 1 to 10 minutes each, depending upon the materials selected to be joined. Members 19 are allowed to cool between each application of coating in any known manner consistent with establishing permanent and durable bonds. Coatings 23 and 24 are uniformly applied over the metal in substantially equal thicknesses with the avoidance of elongation and/or distortion of the metal. The second application of glazing, i.e. coating 24, at a lower temperature does not adversely affect the initial bond created between the metal and coating 23, but on coating actually strengthens the same.

Coated members 19 may be annealed to alleviate stresses developed between coatings 23 and 24 and the coated areas of the metal. Where the sealing or brazing coatings 23 and 24 have substantially the same coefficients of contraction as the metal to which joined, annealing may be eliminated.

A plurality of coated members 19 are held spaced apart and in alignment within a jig fitted into the interior of face plate 12 with coatings 24 in contact with and preferably pressed against flange 16. Fusing heat is applied locally to the intermediate layer of coating 24 to sufficiently soften the same to form a bond between coating 24 and flange 16. The applied heat need only be sufficiently high to soften the interposed coating 24 and thus form the thermal bond without any adverse effects upon parts adjacent to the weld. Reheating coating 24 to its softening point to effect the bonding appears to create a thermal diffusion of at least minor portions of base glass of flange 16 and coating 23 into the lower-melting coating 24. The attachment is accomplished at temperatures below the annealing temperatures of both flange 16 and higher-melting coating 23 to avoid stresses therein. Thus in effect a strata of at least two and possibly more layers of varied vitreous materials may be interposed between metal member 19 and flange 16 for their attachment.

The layers of coating 23 and 24 furnish a stepwise series of vitreous stratum between metal and base glass with the lower-melting between two higher-melting glass compositions. The present glass-to-metal seal does not require a high degree of manual skill nor the use of complicated sealing apparatus. The use of multiple glazing has been found to increase the strength of glass-to-metal bonds by at least threefold over single glazing.

Various modifications may be resorted to within the spirit and scope of the appended claims.

I claim:
1. As an article of manufacture, a load-supporting attachment for a glass cathode-ray tube part comprising a flat L-shaped metallic member, a coating of base glass over at least one attachment surface of said metallic member, said base glass having a coefficient of thermal contraction compatible with that of said metallic member, at least one layer of lower-melting glass sealing composition over said base glass, both said base glass and sealing composition thermally fused to each other and to said metallic member, said glass sealing composition having a fiber softening point temperature below approximately 540° C. and the annealing temperature of said base glass.

2. As an article of manufacture, a cathode-ray tube comprised of face plate and funnel assemblies, the hollow glass face plate assembly adapted for forming the viewing area of said cathode-ray tube, said face plate having a viewing window and an annular flange extending from and along the periphery of said viewing window, a plurality of flat L-shaped metallic members positioned in aligned spaced relationship along the inner wall of said flange, an electron-controlling structure mounted within said annular flange upon said plurality of L-shaped members, a surface portion of each metallic member having a base glass thermally fused thereto, said base glass having a coefficient of thermal contraction compatible with that of each metallic member, and a stratum of glass sealing composition interposed and thermally fused between said base glass and said annular flange thereby integrally joining said metallic members and said glass face plate said glass sealing composition having a fiber softening point temperature below approximately 540° C. and the annealing point temperature of the glass of said face plate.

3. As an article of manufacture, a cathode-ray picture tube comprised of a hollow glass face plate and glass funnel assembly adapted to forming the viewing area and electron emitting area respectively of a cathode-ray tube, said face plate having a concavo-convex viewing window and an annular flange extending from and around the periphery of said viewing window, a plurality of metallic members positioned in aligned spaced relationship along the inner wall of said flange, an electron-controlling element mounted contiguous with the target area of said viewing window, by means of said metallic members a surface portion of each metallic member having the base glass thermally fused thereto, said base glass having a coefficient of thermal contraction compatible with that of each metallic member, and a stratum of low-melting glass sealing composition interposed and thermally fused between said base glass and said annular flange thereby integrally joining said metallic members and said glass face plate, said glass sealing composition having a fiber softening point temperature below approximately 540° C. and the annealing point temperature of said base glass, the said face plate assembly being sealed to said funnel.

References Cited in the file of this patent

UNITED STATES PATENTS

| | | |
|---|---|---|
| 2,100,187 | Handrek | Nov. 23, 1937 |
| 2,248,644 | Reger et al. | July 8, 1941 |
| 2,580,250 | Smith | Dec. 25, 1951 |
| 2,629,093 | Pask et al. | Feb. 17, 1953 |
| 2,653,263 | Lawrence | Sept. 22, 1953 |
| 2,736,832 | Zaphiropoulos | Feb. 28, 1956 |
| 2,777,084 | Lafferty | Jan. 8, 1957 |

FOREIGN PATENTS

| | | |
|---|---|---|
| 584,935 | Great Britain | Jan. 27, 1947 |
| 597,293 | Great Britain | Jan. 22, 1948 |